Patented Jan. 24, 1939

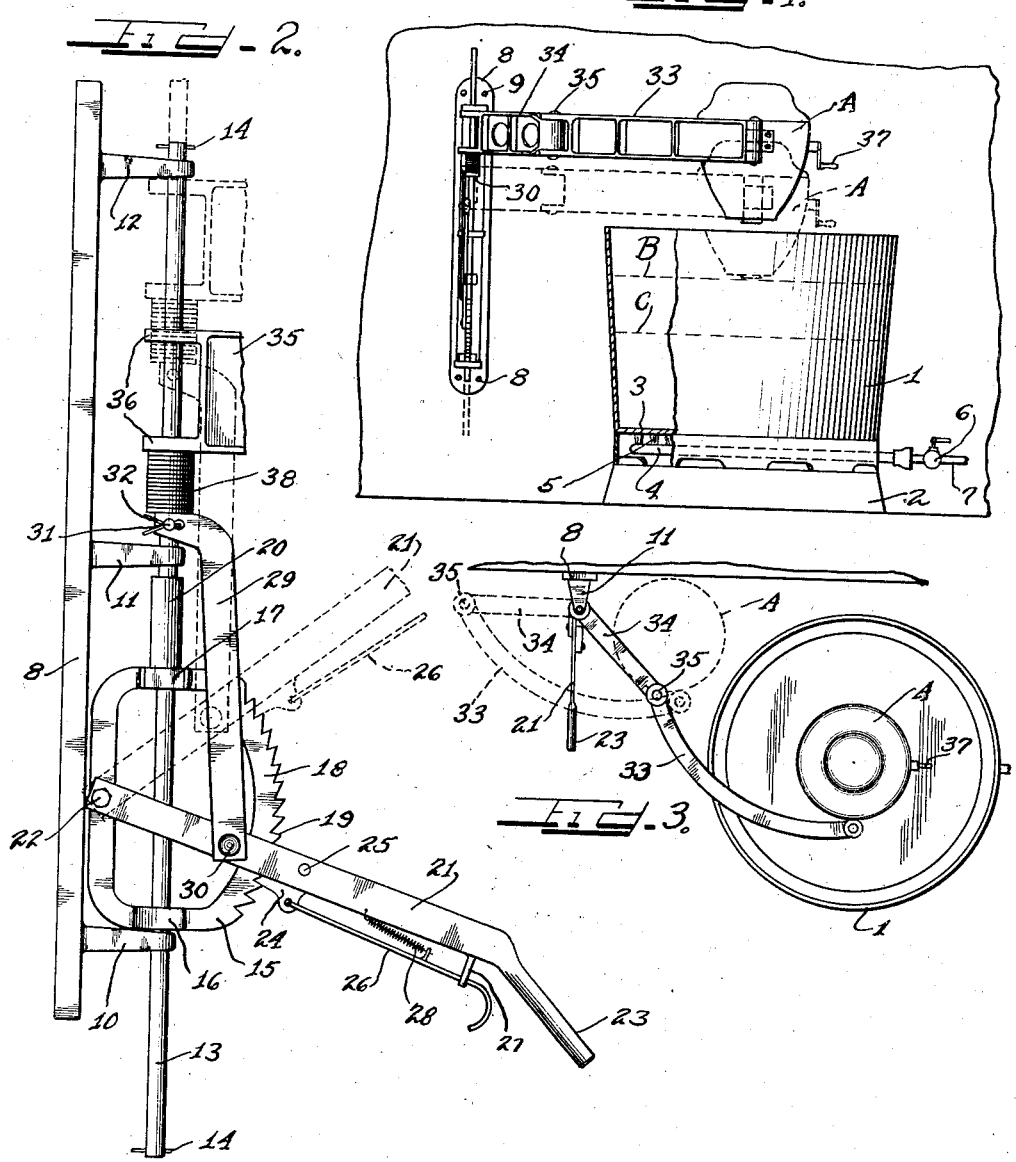

2,144,908

UNITED STATES PATENT OFFICE 2,144,908

ADJUSTING MEANS FOR DOUGHNUT MAKING APPARATUS

William Ferdinand Arntzen, Chicago, Ill.

Application July 26, 1937, Serial No. 155,623

4 Claims. (Cl. 248—296)

The present invention relates, in general, to a doughnut making apparatus and more particularly to the provision of adjusting means for maintaining uniform the distance through which the pieces of doughnut dough drop from the doughnut making machine into the cooking grease.

Another object of the invention has to do with the provision of adjusting means whereby a doughnut machine may be mounted in such manner as to maintain uniform the distance through which the pieces of doughnut dough drop from the machine into the cooking grease, as the surface of the grease lowers because of grease consumption.

A further object of the invention is to provide apparatus whereby doughnuts may be made in quantity lots of uniform size and shape.

The above, other and further objects of the invention will be apparent from the following description, accompanying drawing and appended claims.

In the commercial manufacture of doughnuts, in quantity lots, it is customary to grind out of a doughnut machine pieces of doughnut dough of desired shape and size, which pieces drop into a bath of cooking grease. The distance through which the pieces of dough drop, determines the shapes of the finished doughnuts. It has been found in practice, that, when large quantities of doughnuts are so made, the grease of course, is gradually consumed, thus lowering its surface in the tank or tub in which it is contained. Such lowering of the surface of the grease increases the distance through which the pieces of doughnut dough drop, with a consequent change in shape of those pieces falling the greater distances. This has proved unsatisfactory in that a large batch of doughnuts will have different shapes when finished.

The present invention serves to overcome this objection in providing means for so supporting the doughnut making machine, with respect to the surface of the cooking grease, as to maintain the distance uniform as the grease is consumed. This is made possible by so mounting the doughnut machine as to enable it to be lowered, gradually, as the grease is consumed, and thus maintain uniform the distance through which the pieces of dough drop.

The accompanying drawing illustrates an embodiment of the apparatus of the present invention.

The views of the drawing are as follows:

Figure 1 is an elevational view of a doughnut making apparatus embodying principles of the present invention, showing a part of the grease tub cut away, showing in full lines the uppermost position of the doughnut making machine and its support, and in dotted lines, a lower position of such machine and support.

Figure 2 is an enlarged elevational view, with a fragmental portion of the supported object or arm, shown in full lines in lowermost position and in dotted lines in uppermost position.

Figure 3 is a top plan view of the arrangement of Figure 1 showing in full lines the doughnut making machine extended to overlie the grease tub and in dotted lines the position assumed by the doughnut making machine and its support when moved or swung away from over the grease tub.

The drawing will now be explained.

A grease tub 1, of conventional form, is mounted on a base 2 and below its bottom 3 there is provided a gas pipe 4 for the gas flames 5 for heating the contained grease. The pipe 4 is connected by means of a valve 6 with a supply line 7.

On a convenient wall or post is attached a bracket 8 by means of bolts 9, which bracket, in the form herein illustrated, is provided with three vertically spaced and apertured ears 10, 11 and 12. A rod 13 is supported in the ears 10, 11 and 12, and is herein illustrated as being vertically reciprocable. The rod is removably retained in the ears by means of cotter pins 14 passing through suitably disposed holes in the extremities of the rod.

A toothed sector 15 is loosely supported on the rod 13 above the lowermost ear 10. The sector 15 is provided with enlargements 16 and 17 to receive the rod 13. The sector 15 has an arcuate portion 18 provided with teeth 19. A spacer 20 surrounds the rod 13 between the sector 15 and the intermediate ear 11.

A lever 21 is pivoted at 22 to a portion of the sector, and has a handle 23. A latch or detent 24 is pivoted at 25 to the lever 21 in position to engage any of the teeth 19 of the sector. A finger rod 26 is connected at one end to the latch 24 and has its other end bent to receive a finger of the operator, and is supported near the bent end by a lug 27 formed as a part of the lever 21. A spring 28 connected between the rod 26 and the lever 21 urges the rod 26 in a direction to normally maintain the latch or detent 24 in engagement with any tooth of the sector.

A link 29 is pivoted at one end at 30 to the lever and, at its other end, is connected to a block 30a surrounding the rod 13. The block 30a has an extension 31 which passes through an aperture in the link 29 and is connected in position by means of cotter pin 32 passing through a suitably arranged opening in the extension 31. The block may be fastened to the rod 13 by a set screw or other means, or may be slidable along the rod. In the form herein illustrated and described, this block is fastened to the rod 13 so as to cause vertical reciprocation of the rod 13 as the lever 21 is swung about its pivotal connection with the sector 15.

A doughnut machine, designated generally at A, of well-known type, is pivotally connected to the end of a swinging arm 33, which arm in turn is pivoted at 34 to another arm 35. The arm 35 is illustrated as having ears 36 encircling the rod 13. The arm 35 is rotatable about the rod 13 and may or may not be fixed to the rod to rotate with it or with respect to it.

The doughnut machine A is provided with the usual hand crank 37 for grinding out pieces of doughnut dough in order that the same may drop into the grease within the tub 1.

When it is desired to fill the tub 1 with grease, then the doughnut machine A is swung back into the dotted line position of Fig. 3, whereupon the tub is filled to proper height, which is that indicated by the dotted lines B of Fig. 1. The doughnut machine A has, in the meantime, been filled with doughnut dough whereupon it is then swung over the tub 1 and the crank operated in the usual manner.

At the time the doughnut machine is filled and the grease tub 1 has been filled to the upper line B, the lever 21 is actuated to raise the doughnut machine to the full line position of Fig. 1, and the dotted line position of Fig. 2. In this position, the lever 21 will occupy the dotted line position of Fig. 2. In this position, the detent or latch 24 engages a tooth of the sector 15 to maintain the doughnut machine A supported in its uppermost position. The hand crank 37 is operated and the pieces of doughnut dough then dropped into the cooking grease within the tub 1. The doughnut machine may be moved about over the tub 1 so as to deposit pieces of dough all over the surface of the grease. As the doughnuts are cooked by the grease, the grease is consumed and the surface thereof in the tub lowered. When the grease has lowered an appreciable amount, or, any amount, the lever 21 is then actuated to lower the doughnut machine A the proper distance so as to maintain uniform the distance between it and the surface of the grease within the tub 1. In this manner, all of the pieces of doughnut dough drop through uniform distances and thus result in production of doughnuts of uniform size and shape.

The dotted line C of Fig. 1 represents the surface of the cooking grease when it has diminished to a considerable extent and the dotted line position of the doughnut machine A shows its relative position with respect to the surface of the grease when it has lowered to the line C. It will be observed that the distance between the doughnut machine A in the full line position of Fig. 1 and the line B within the tub 1 is substantially equal to the distance between the doughnut machine A in the dotted line position and the line C of Fig. 1.

In order to properly position the arms 33 and 35, supporting the doughnut machine A, with respect to the upper grease level B, washers 38 may be interposed between the block 30ª, on the rod 13, and the arm 35.

The teeth 19 of the sector 15 are so designed and spaced as to allow gradual lowering of the doughnut machine A commensurate with the lowering of the surface of the cooking grease in the tub 1.

It will be observed that this invention provides means for maintaining uniform the distance through which pieces of doughnut dough so dropped between a doughnut machine and the surface of the cooking grease thereby forming doughnuts, in quantity production, of uniform shape and size.

The doughnut machine A is connected to the arm 33, by a pivotal joint so that the machine may be swung, with respect to the arm 33, to various angular positions.

An important feature of my invention resides in the fact that it is possible to operate with a much smaller amount of cooking grease than heretofore required. This is possible because the machine may be lowered into close proximity to the body of grease so that there is no distortion of the pieces of doughnut dough as the same are dropped into the grease. By using a smaller body of cooking grease, there is a consequent saving of grease and of fuel used in heating the same.

The invention has been described herein more or less precisely as to details, yet it is to be understood that the invention is not to be limited thereby, as changes may be made in the arrangement and proportion of parts and equivalents may be substituted, without departing from the spirit and scope of the invention.

The invention is claimed as follows:

1. A device for supporting a swinging arm to enable incremental vertical adjustment of said arm comprising an elongated base plate adapted to be secured to a vertical support, said plate being provided with a plurality of horizontally projecting apertured ears vertically spaced one from another, a rod vertically movable in the apertures of said ears, a toothed sector loosely supported on said rod between two of said ears and normally resting on the lower ear of the two, means between said sector and the upper of said two ears to prevent movement of said sector with the rod, a lever pivoted to said sector and carrying a detent engageable with the teeth thereof to latch said lever in adjusted position, a link connected at one end to said lever and at the other end to said rod to move said rod vertically in accordance with the swing of the lever, and an arm swingably mounted on said rod between other than said two ears.

2. A device for supporting a swinging arm to enable incremental vertical adjustment of said arm comprising an elongated base plate adapted to be secured to a vertical support, said plate being provided with a plurality of horizontally projecting apertured ears vertically spaced one from another, a rod vertically movable in the apertures of said ears, a toothed sector loosely supported on said rod between two of said ears and normally resting on the lower ear of the two, means between said sector and the upper of said two ears to prevent movement of said sector with the rod, a lever pivoted to said sector and carrying a detent engageable with the teeth thereof to latch said lever in adjusted position, a link connected at one end to said lever and at the other end to said rod to move said rod vertically in accordance with the swing of the lever, and an arm swingably mounted on said rod between other than said two ears, said rod being provided with means to prevent its accidental displacement from said ears.

3. A device for supporting a swing arm to enable incremental vertical adjustment of the arm comprising an elongated base plate adapted to be secured to a vertical support, said plate being provided with a plurality of horizontally projecting apertured ears vertically spaced one from another, a rod endwise movable in the apertures of said ears, a member loose on said rod and having a ratchet portion extending in the direction of the length of the rod, a lever pivoted to said member and carrying a pawl for latching engagement with said ratchet to adjust the lengthwise position of the rod with respect to said base plate, a link connection between said lever and said rod, means preventing movement of said member with said rod, a load supporting arm carried by said rod to swing in a horizontal plane, the construction being such that vertical adjustment of said rod causes corresponding vertical adjustment of said arm.

4. A device for supporting a swinging cantilever load supporting arm to enable incremental vertical adjustment of said arm, comprising a base plate adapted to be secured to a vertical support, said plate being provided with a plurality of horizontally projecting apertured ears vertically spaced one from another, a rod vertically movable in the apertures of said ears, a toothed sector loosely supported on said rod between two of said ears, means for preventing movement of said sector with said rod, a lever pivoted to said sector and carrying a detent engageable with the teeth thereof to latch said lever in adjusted position, a link connected at one end to said lever and at the other end to said rod to move said rod vertically in accordance with the swing of the lever, and a cantilever arm swingably mounted on said rod in position other than between said two ears.

WILLIAM FERDINAND ARNTZEN.